United States Patent [19]

Sprague et al.

[11] Patent Number: 4,805,220
[45] Date of Patent: Feb. 14, 1989

[54] CONVERSIONLESS DIGITAL SPEECH PRODUCTION

[75] Inventors: Richard P. Sprague, Westminster; Kevin R. Kachikian, Fountain Valley, both of Calif.

[73] Assignee: First Byte, Long Beach, Calif.

[21] Appl. No.: 932,153

[22] Filed: Nov. 18, 1986

[51] Int. Cl.$^4$ .............................................. G10L 7/02
[52] U.S. Cl. ................................... 381/51; 364/513.5
[58] Field of Search ..................................... 381/36–40, 381/51, 52; 364/513.5

[56] References Cited

U.S. PATENT DOCUMENTS 4,617,645 10/1986 Sprague .................................. 365/45
4,692,941 9/1987 Jacks et al. ............................. 381/52

Primary Examiner—Patrick R. Salce
Assistant Examiner—Emanuel Todd Voeltz
Attorney, Agent, or Firm—Weissenberger & Peterson

[57] ABSTRACT

Clear speech can be produced on a DAC-less personal computer from an all-software speech-generating program with an unlimited vocabulary by applying to the computer's speaker a square-wave carrier signal of ultrasonic frequency, and varying the duty cycle of the carrier signal in accordance with digitized speech samples to produce an audio signal. The computations necessary to produce the speech samples are so timed by the program that the CPU is free to turn the speaker on and off between computations at precisely the right instant for the correct generation of a carrier having a constant ultrasonic frequency and a duty cycle determined by the value of the speech samples.

5 Claims, 2 Drawing Sheets

CONVERSIONLESS DIGITAL SPEECH PRODUCTION

FIELD OF THE INVENTION

This invention relates to digital text-to-speech conversion systems, and more particularly to a system which does not require a digital-to-analog converter for the production of speech.

BACKGROUND OF THE INVENTION

Text-to-speech conversion systems are commercially available in which text encoded as computer-readable characters is converted, by a software program usually sold on a floppy disk, into a digital bit stream representing an audio signal. This digital bit stream is conventionally converted into an analog signal by a digital-to-analog converter (DAC). When this analog signal is applied to a loudspeaker, the spoken words corresponding to the encoded text are heard.

A problem arises when such an all-software program is to be used on a computer which does not have a DAC. Such computers are typically used for low-cost personal computer (PC) applications in which only single-frequency tones or game noises need to be produced. For tones such as the "bell" tone commonly used on personal computers, the central processing unit (CPU) of the computer produces a pulse train which turns the speaker on and off at the desired tone frequency. For game sounds, a random waveform centered about zero is digitally generated and infinitely clipped (i.e. if the sign of a sample is positive, the speaker is turned on, and if it is negative, the speaker is turned off).

If infinite clipping is performed on a waveform representing a spoken word, the sound produced by the speaker is marginally recognizable speech, but the vast amounts of spurious frequencies generated by the clipping make this process useless for applications in which speech quality is a factor.

In either case (bell tone or game sound), the CPU is tied up for the duration of the sound output and cannot perform other functions.

SUMMARY OF THE INVENTION

The present invention makes it possible to produce clear speech with DAC-less computers from an all-software speech generating system with unlimited vocabulary by switching the computer's speaker on and off at an ultrasonic carrier rate and varying the on/off duty cycle at audio frequencies according to the speech signal to be produced.

In accordance with the invention, carrier clicks or transients are prevented by generating the ultrasonic carrier continuously through silent periods as well as during phonemes, and speech generation in real time is made possible by interleaving the speech-generating CPU operations with the speaker-on and speaker-off operations of the CPU.

It is therefore the object of the invention to produce clear, audible speech from digitized audio waveforms in a DAC-less computer.

It is another object of the invention to produce speech in a DAC-less computer by modulating the duty cycle of an ultrasonic square-wave carrier generated by the computer under program control.

It is still another object of the invention to produce speech in a DAC-less computer by interleaving the calculations required for speech generation with the operations involved in the generation of the carrier by the CPU.

DESCRIPTION OF THE PREFERRED EMBODIMENT

Figure 1:
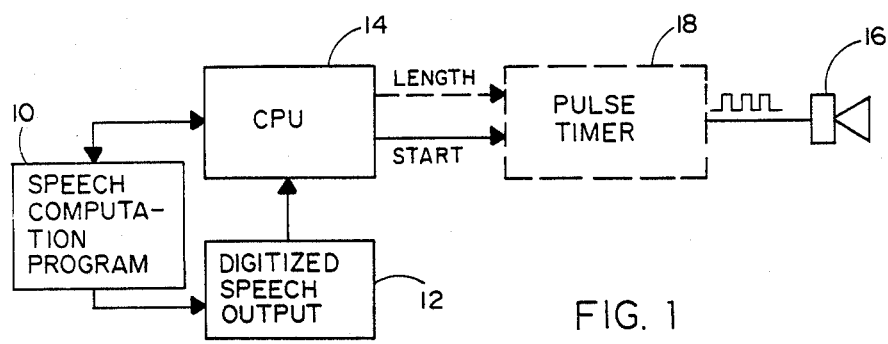
FIG. 1 is a block diagram illustrating the hardware and software involved in the use of the invention.

FIG. 1 illustrates the basic combination of software and hardware used in carrying out the present invention. In an all-software text-to-speech conversion system such as that described in copending application Ser. No. 598,892 filed Apr. 10, 1984 and entitled TEXT-TO-SPEECH CONVERSION SYSTEM (or, more specifically, in the system marketed under the name "Smooth-Talker" by First Byte, Inc. of Long Beach, Calif.), a software program 10 contained on a floppy disk produces an output train 12 of digitally encoded samples representing speech, at a fixed sampling rate of 11.1 kHz. The program 10 use the CPU 14 to compute the samples of the speech output 12 from stored digitally encoded waveforms by means of algorithms not material to this invention.

In some PCs, the speaker 16 can be turned on and off directly by the clock-calendar chip for the production of the "bell" tone. The clock-calendar chip is typically accessible through one of the input/output addresses to change the duration of the on-off pulse. In other PCs, the CPU turns on each pulse, but a separate pulse-timer-processor 18 turns it off after a length of time specified by the CPU. In still other PCs, the CPU turns the speaker on and off under direct program control.

Regardless of which of these speaker control methods any given PC uses, the system of this invention causes the CPU, by appropriate software instructions, to turn the speaker on at a fixed ultrasonic rate which, in the preferred embodiment, is 22.2 kHz, i.e. twice the sample rate of the speech output 12. The speaker is turned off under program control in such a manner as to continuously vary the pulse length in accordance with the audio signal representing the speech.

Figure 2A:
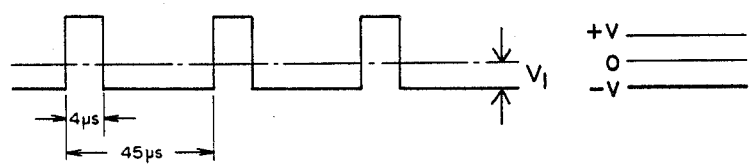
FIG. 2a is a time-amplitude diagram showing the carrier duty cycle for the maximum negative audio signal level.
Figure 2B:
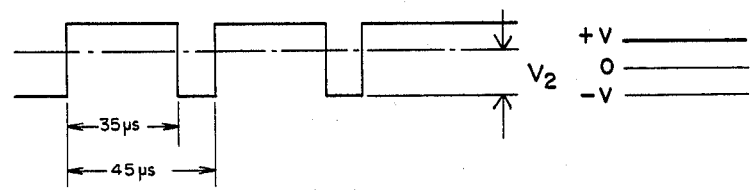
FIG. 2b is a time-amplitude diagram showing the carrier duty cycle for the maximum positive audio signal level.
Figure 2C:
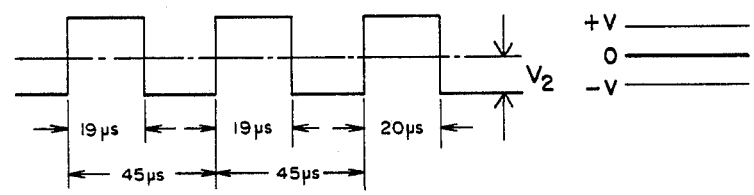
FIG. 2c is a time-amplitude diagram showing the carrier duty cycle for the zero audio signal level.
Figure 3:
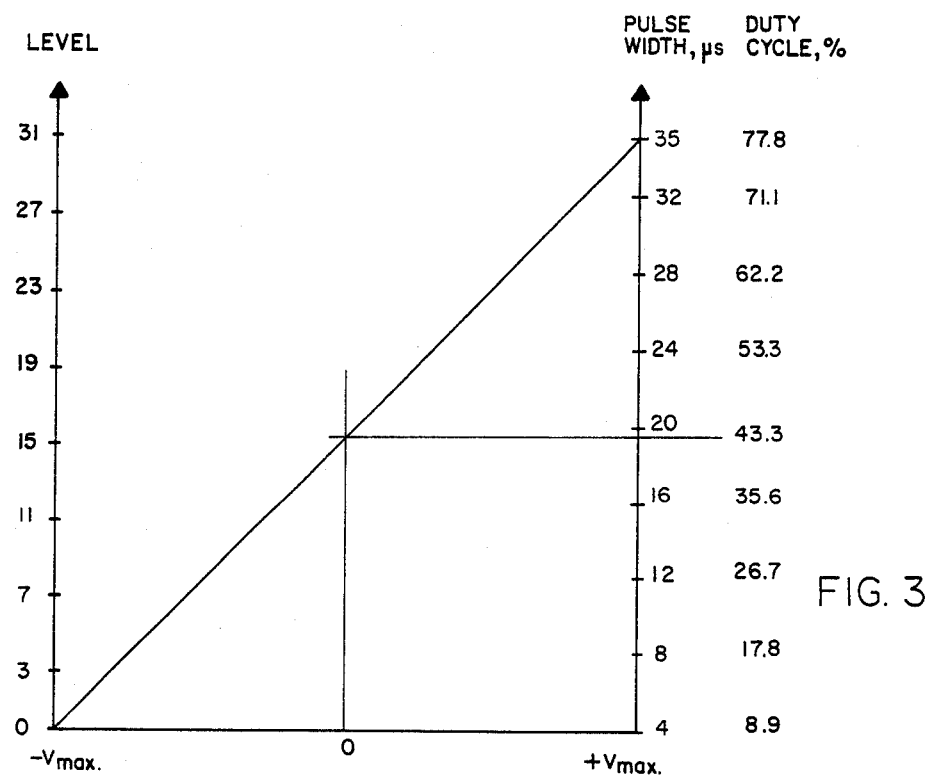
FIG. 3 is a diagram showing the relationship between duty cycles and audio signal levels.

FIGS. 2a through c illustrate the pulses applied to the speaker 16. The samples of speech output 12 are, in the preferred embodiment, encoded in sixteen positive and sixteen negative levels, for a total of thirty-two levels. As illustrated by FIGS. 3 and 2a, level 0 (the most negative audio signal level) corresponds to a pulse duration of 4 μs. Because the pulse interval is always 45 μs (1/22.2 kHz), the speaker at this level is on for 4 μs and off for 41 μs, resulting in a duty cycle of 8.9%.

At level 31 (the most positive audio signal level), the speaker is on for 35 μs and off for 10 μs in the preferred embodiment (FIG. 2b), resulting in a duty cycle of 77.8%. Silence, i.e. zero audio signal, is produced by alternating pairs of 20 μs and 19 μs pulses (FIG. 2c), for an average duty cycle of 43.3%. Pulses are produced in pairs because each 11.1 kHz sample produces two 22.2 kHz carrier pulses.

It will be seen that the average voltage on the speaker coil varies at audio frequencies in accordance with the speech output sample values. Thus, in accordance with Nyquist's law of digital sampling, audio frequencies up to 5.55 kHz (11.1 kHz/2) can be faithfully reproduced by the speaker 16. This is more than enough for natural-sounding speech.

The use of this invention entails some practical difficulties. To begin with, silence is represented not by zero voltage but rather by a steady positive average voltage on the speaker coil. Therefore, any interruption of the carrier pulses results in an annoying click in the speaker. It is thus necessary to maintain the carrier throughout the use of the speech-generating program.

An alternative to maintaining the carrier continuously is the provision of a ramping function at the beginning and end of each major period of silence. In that case, the program 10 gradually decreases the audio signal level at the beginning of the silent period (and increases it at the end) at a sufficiently slow rate to produce no audible click. The final jump from audio level 0 to elimination of the carrier (or the initial jump to audio level 0) is small enough to be essentially inaudible.

Another problem is the criticality of the timing to prevent sidebands of the carrier from appearing in the audio range. For example, the alternation of 19 $\mu$s and 20 $\mu$s pulses during silent periods in the speech pattern produces a weak 11.1 kHz beat frequency, but the weakness of the beat and the poor response of most PC speakers at that frequency make it essentially inaudible.

A third problem arises from the need to use the CPU for calculating the speech output samples while at the same time generating the carrier. The invention solves this problem by interleaving the speech computations with the speaker on-off commands. For example, in a PC in which only the turn-on function of the speaker 12 needs to be performed by the CPU 14, the speech computation program must contain a turn-on instruction every 45 $\mu$s, while the pulse length signal to the pulse timer 18 is issued by the CPU 14 under the control of the current sample of speech output 12. In a PC in which the program directly controls the speaker 12 or gives the CPU 14 both speaker-on and speaker-off instructions, the program itself must evaluate the speech output and issue appropriate instructions at the proper time.

My copending application entitled COMPRESSION OF STORED WAVEFORMS FOR ARTIFICIAL SPEECH filed on even date herewith discloses a number of techniques by which the memory requirements of a speech generating system can be reduced at the cost of additional computations. Depending on the speed of the CPU 14, it may be necessary to forego some of the memory compaction in order to fit all the computations for the generation of each speech sample into the somewhat less than 90 $\mu$s interval during which, for each pair of pulses, the CPU 14 and program 10 are not busy controlling the speaker 16. Due to the fact that different sample computations require different known numbers of CPU operations, the program 10 must be so padded with Nop (no operation) instructions during its off-line construction that the turn-on and turn-off instructions are executed at precisely the right cycle of the (usually 1 or more MHz) computer clock.

As a practical matter, the algorithms necessary for the computation of speech output samples in the system of application Ser. No. 598,892, as enhanced by the teachings of U.S. Pat. No. 4,617,645, and of my aforesaid concurrently filed application, are sufficiently simple to be performable by most modern PCs in the available interval, with time left over to compute the pulse width in terms of the output sample level as explained above.

It will thus be seen that the present invention provides a method of producing clear, highly intelligible and natural-sounding speech on a DAC-less PC through the use of an all-software speech generating system.

We claim:

1. Apparatus for producing speech from digitally encoded speech samples without the use of a digital-to-analog converter, comprising:
   (a) speech computation means for producing a sequence of digitally encoded samples representing the waveform of speech to be produced;
   (b) a computer central processing unit;
   (c) a speaker; and
   (d) control means for applying to said speaker a square wave signal having a duty cycle controlled by said speech computation means in accordance with the speech to be produced;
   (e) said square wave signal having a constant frequency in the ultrasonic range.

2. The apparatus of claim 1, in which said control means are associated with said central processing unit, the operation of said control means involving an operation of said central processing unit.

3. The apparatus of claim 2, in which said central processing unit carries out the calculations required in the computation of said digitally encoded samples by said speech computation means, and said speech computation means is so structured that said central processing unit performs said calculations in the interval between those operations of said central processing unit which are involved in the operation of said control means.

4. The apparatus of claim 1, in which silence corresponds to a steady, non-zero duty cycle of said square wave signal.

5. The apparatus of claim 4, in which the duty cycle of said square wave signal is gradually reduced at the beginning of a prolonged period of silence, and increased at the end thereof, at a rate sufficiently slow to produce no audible transient.

* * * * *